United States Patent [19]
Johnson et al.

[11] Patent Number: 5,026,197
[45] Date of Patent: Jun. 25, 1991

[54] EJECTOR ROD QUICK COUPLER

[75] Inventors: Michael L. Johnson; Chetan N. Patel, both of Houlton; Marcel D. Plourde; Brian J. Wiederin, both of Somerset, all of Wis.

[73] Assignee: Scientific Molding Corporation, Ltd., Somerset, Wis.

[21] Appl. No.: 445,423

[22] Filed: Dec. 4, 1989

[51] Int. Cl.⁵ .............................................. F16D 1/00
[52] U.S. Cl. ...................................... 403/24; 403/373
[58] Field of Search ................... 279/67, 112; 403/24, 403/373

[56] References Cited

U.S. PATENT DOCUMENTS

| Re. 9,123 | 3/1880 | McWilliams | 279/67 |
| 1,969,827 | 8/1934 | Tautz | 279/67 X |
| 2,428,688 | 10/1947 | Stischer | 279/67 |

Primary Examiner—Andrew V. Kundrat
Attorney, Agent, or Firm—Douglas L. Tschida

[57] ABSTRACT

A retainer for supporting an injection molding machine ejector bar. The retainer is mounted to a hydraulic ram and secures an ejector bar in clamped relation relative to an extractor pin assembly secured to a molding die. The retainer includes a relatively large self-aligning cavity wherein an ejector bar end is confined via a transverse mounted jaw having a ridged gripping surface that interconnects with an annular slot formed in the ejector bar.

11 Claims, 3 Drawing Sheets

EJECTOR ROD QUICK COUPLER

BACKGROUND OF THE INVENTION

The present invention relates to injection molding machines and, in particular, to an assembly for releasably supporting the extractor bars which interconnect a hydraulic ram to the extractor pin assembly of a molding machine die holder.

A reality of all injection molders is that of having to periodically change the sets of molding dies or cavities, which are mounted to the molding machine and which determine the configuration of the molded parts. While the complexity of the mold cavities can vary relative to the part being formed, they generally are secured to the molding machine via a relatively substantial outer housing or die holder which supports the dies in a fashion that permits a controlled separation and provides a coolant manifold to the channelways of the dies. Most commonly, one of the dies is slidably supported relative a rigidly mounted die which is secured to the die holder. The die holder, in turn, is secured to the molding machine. A plurality of extractor bars interconnect a hydraulic ram to an extractor pin assembly that mount adjacent the slide mounted die and whereby the movable die cavities can be separated from the rigid die, upon completion of a mold cycle, to permit extraction of the molded part.

Specifically, a pair of relatively long hexagonal or cylindrical shaped bars, variously referred to as ejector rods or extractor bars; extend between a plate mounted to one side of the movable die, which plate supports a plurality of smaller pins that pass through the movable die and push against the rigid die, and a ram plate at the end of the hydraulic piston. Each ejector bar is typically secured at its opposite ends via threaded mountings. That is, one end includes a threaded extension which mates with the plate member and the opposite end includes a coaxial, threaded bore which aligns with the ram plate. A screw fastener is insertable through the ram plate to draw each ejector bar to the ram plate.

In theory the foregoing mounting is not unduly cumbersome. In practice, however, and especially for a prototype or limited run production shop, numerous die changes may be required over the course of a day, with attendant compounding of lost production time. Because the ejector bars must be attached and re-attached with each die change, the tedious task of blindly aligning the ejector bars with the ram plate and screw fasteners can be rather costly.

In this regard, it is to be appreciated that a die change over is typically performed by the operator having to stand to one side or reach from the top into the center area of the molding machine, all without the advantage of being able to view the alignment of the bar bore relative to the ram plate. Oftentimes, therefore, the time to effect a die change depends on fortuity and one's luck in blindly aligning the piece parts. The time loss is compounded by the number of ejector bars which must be aligned.

The foregoing problems are indigenous to all injection molders of which applicant is aware and has been for numerous years. The only solution of which applicant is aware is a slotted nut assembly that may be manipulated to expose a longitudinal slot which permits the mounting of the nut assembly anywhere along the length of a threaded rod. Once mounted, the nut assembly is twisted to completely encircle the threaded rod and after which the nut may be tightened in conventional fashion.

In contrast to the foregoing, the present invention contemplates a clamping assembly which receives and self-aligns each ejector bar. Most important, the assembly is transversely accessible and operable relative to the ejector bars.

SUMMARY OF THE INVENTION

It is accordingly a primary object of the present invention to provide a tool hardened holder which is permanently mountable to an injection molding machine to clamp couple to the ejector bars in lieu of providing a threaded connection thereto.

It is a further object of the invention to provide for an assembly including a self-aligning aperture whereat the ejector bars may be readily received, even if not perfectly aligned and centered, as the coupling is effected.

It is a further object of the invention to provide for a transversely operable assemblY whereby a machine operator may view the alignment action from one side of a molding machine.

It is a yet further object of the invention to provide for an assembly with relatively few piece parts to prevent wear and tear over time.

Various of the foregoing objects, advantages and distinctions of the present holder are particularly achieved in a presently preferred construction which includes a housing that is permanently attachable to the ram plate via threaded fasteners. The holder includes a slotted channelway in a surface exposed to the ends of the extractor bars and wherein each bar end is received. A movable yoke or U-shaped jaw member is slidably mounted within the holder to one side of an oversized bore where the ejector bar is received to grasp an annular groove formed in the end of the ejector bar. The edge of the jaw is also tapered to facilitate grasping of the annular grove. Adjusting means coupled to the moveable jaw is accessible and viewable from the side or top of the molder to permit the operator an unobstructed view as each ejector bar is clamped to its holder.

Yet other objects, advantages and distinctions of the present invention, as well as the details of the foregoing presently preferred construction, will become more apparent from the following description and to the appended drawings. To the extent various modifications and/or improvements have been considered, they are described as appropriate. Otherwise, it is to be appreciated the following description is made by way of presently considered embodiments only, which should not be interpreted in strict limitation to the form and manner disclosed. Rather they should be interpreted in view of the breath of the following claims.

DESCRIPTION OF THE PREFERRED EMBODIMENT

Figure 1:
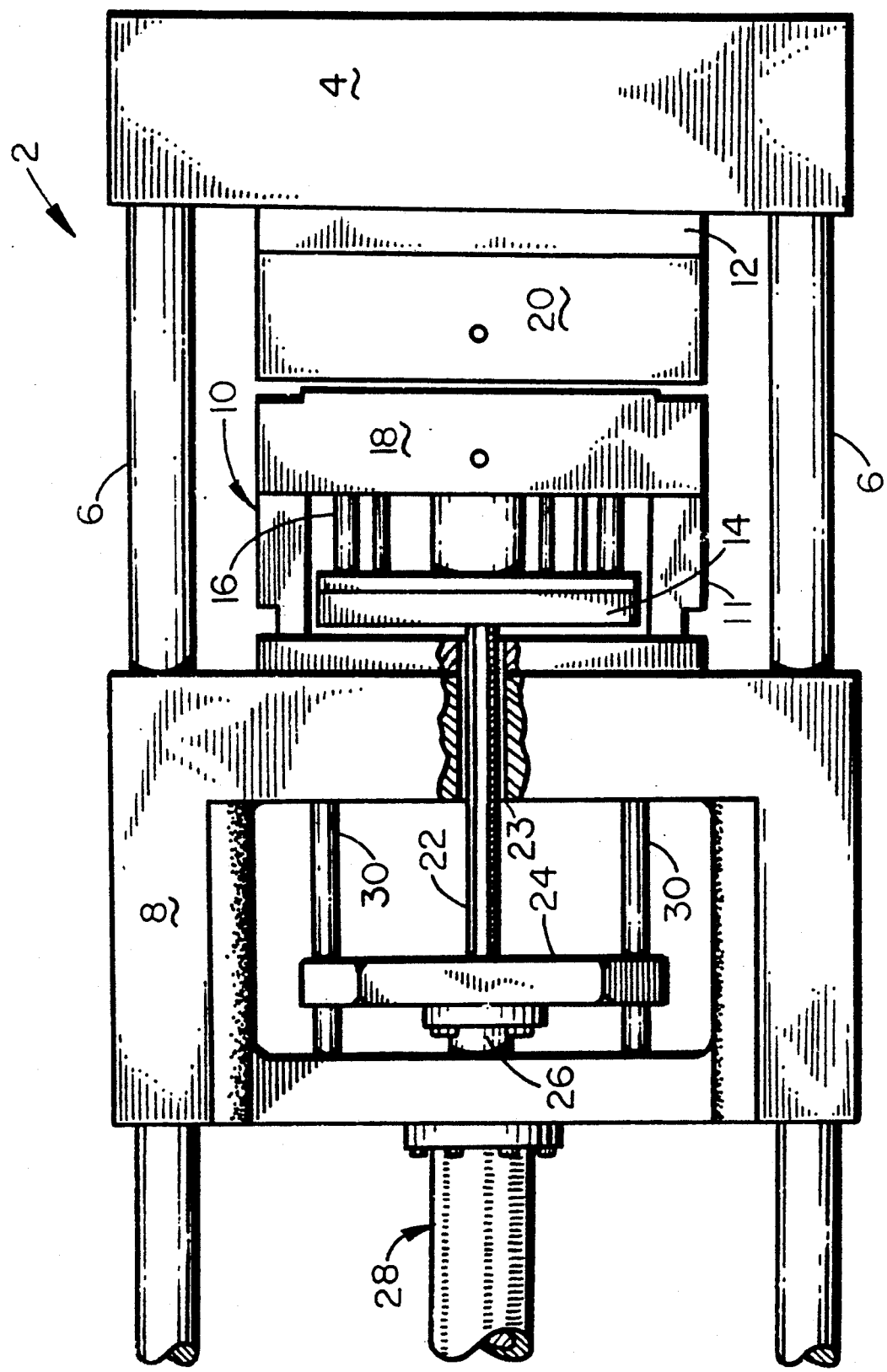
FIG. 1 shows a side elevation view of a portion of a typical injection molding machine and the relative mounting relationship of the principal components to one another.

Referring to FIG. 1, a side elevation view is shown of a portion of a typical injection molding machine 2. Depending upon the injection forces which the molding machine 2 is capable of sustaining, the configuration and construction of the molding machine 2 may be varied.

Common attributes of all such molding machines 2, however, is that they provide a substantial cast metal framework having a stationary, mold receiving and supporting end portion 4. Extending from the end portion 4 are a pair of slide rails 6 and along which are mounted a cast clamp collar 8. The collar 8 is laterally movable to engage the left side of a die holder or die support housing 10 (shown in partial assembly) that is otherwise bolted on its right side to the end portion 4 and clamped on its left side by the collar 8. The housing 10 provides for multiple, laterally extending dovetail channels (not shown) which support die cavities 18 and 20 between an extractor portion 11 and an end plate 12 to which the rigidly mounted die 20 is secured and wherethrough bolts secure the housing 10 to the end member 4.

Slidably mounted interiorly of the extractor portion 11 is a plate 14 which includes a plurality of pins 16 that induce separation of the die cavity 18 from the cavity 20. Extending from the left or rear surface of the plate 14 and through the extractor portion 11 and collar 8 are a pair of extractor or ejector bars or rods 22. The ejector bars typically comprise lengths of hexagonal or cylindrical rod stock.

The ejector bars 22 extend through apertures 23 (shown in cutaway) in the clamping member 8 and are typically secured via threaded fasteners (not shown) to a ram end plate 24 which extends from the piston 26 of a hydraulic ejector ram assembly 28 that extends from the collar 8. As with the slide mounting of the clamp collar 8 to the slide rails 6, similarly the ram plate 24 is slidably mounted to a pair of slide rails 30 which over and underlie the ejector bars 22. Thus, the ejector bars 22 extend interiorly of the die support housing 10 such that a to and fro operation of the piston 26 and ram plate 24 induces a similar linear motion of the ejector bars 22 and the ejector pins 16 and consequent separation of the die cavities 18, 20 at the end of each molding cycle.

Figure 2:
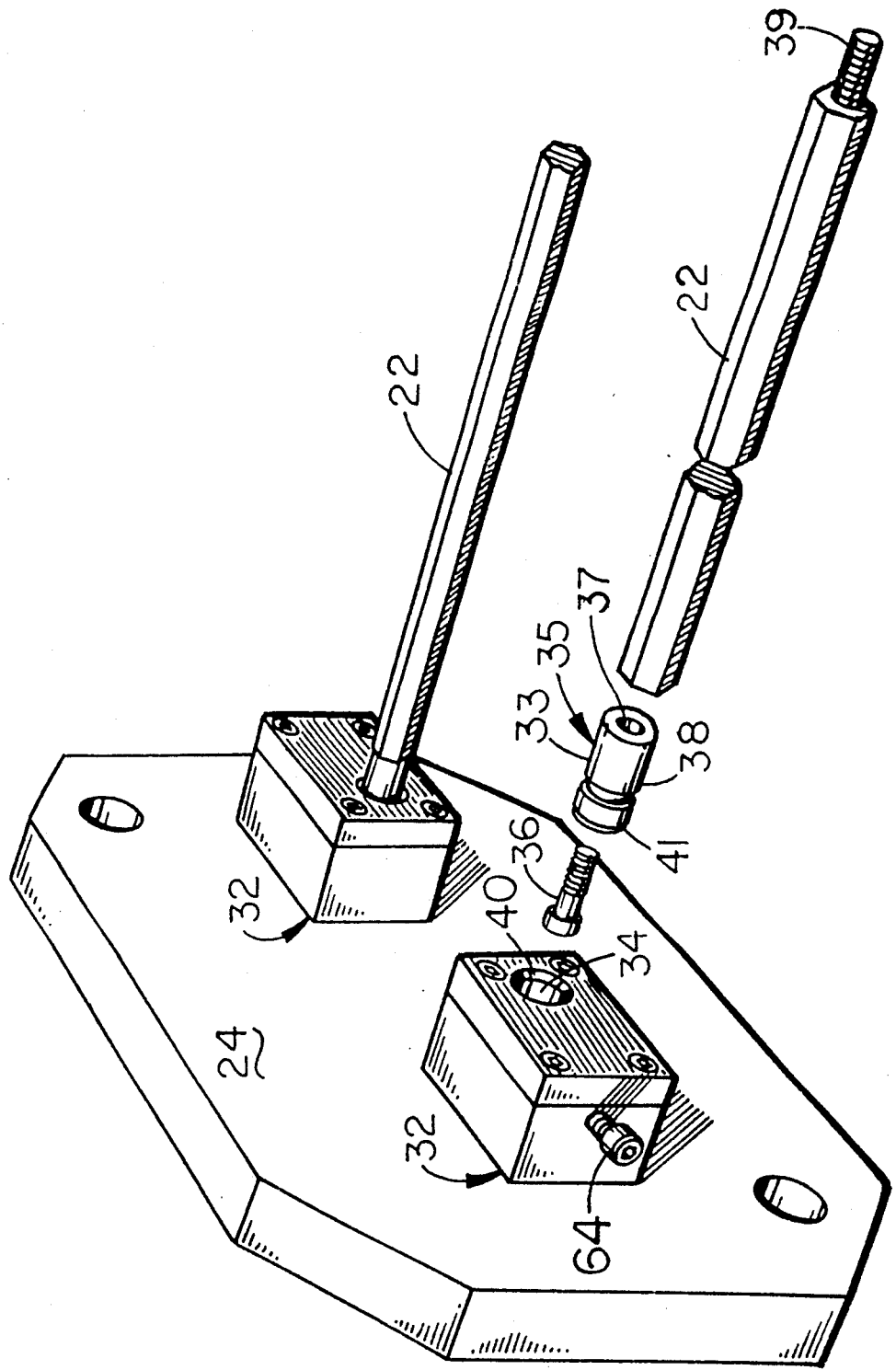
FIG. 2 shows an isometric view of the ejector ram plate and a pair of the present holders secured thereto in relation to a pair of extractor bars.

Directing attention to FIG. 2, an isometric view is shown of the ram plate 24 relative to a pair of quick disconnect ejector bar retainers or holders 32 of the present invention, independent of the molding machine 2. Whereas FIG. 1 depicts a typical prior art mounting of the ejector bars 22, FIG. 2 shows the improved mounting of such bars 22 in relation to the present holder 32. In that regard, a foreshortened view is shown of the rear bar 22 as it is normally secured to the holder 32, while the front bar 22 is shown in exploded assembly and displaced to one side of its holder 32.

The construction of the right and left ends of each ejector bar 22 is most apparent from the front bar 22. The right end particularly includes a threaded extension 39 which normally slip mounts through the collar 8 at the aperture 23, before being secured to a drilled and tapped hole at the ejector plate 14. The left end of each bar 22 is, in turn, received within each holder 32 and clamped at a grooved end assembly 35.

The end assembly 35 particularly comprises a bored extension piece having a chamfered end 41 which is securable to each bar 22 via a fastener 36. The fastener 36 mounts through a longitudinal bore 37 and mates with a threaded bore (not shown), normally provided in the end of all currently used ejector bars 22, to secure the extension piece 33 to the bar 22. An annular groove 38 is formed in each extension piece 33 and whereat each bar 22 is clamped to each holder 32 and a contained jaw 58.

As mentioned and prior to the subject invention, it was necessary to align the undepicted end bore of each bar 22 with a threaded fastener passed through the ram plate 24. This operation was normally performed blind, since space does not permit viewing access by the operator to the area behind the ram plate 24. In this regard, it is to be further appreciated that the relative weight and bulk of the die support housing 10, even though normally supported from a block and tackle, exaggerates alignment difficulties.

Formed within the exposed outer face of each holder 32 is an oversize bore hole 34 (i.e. relative to the diameter of the ejector bar 22) having chamfered or inwardly tapering outer peripheral edges 40. The edges 40 and chamfered ends 41 of each extractor bar 22, cooperate to facilitate the alignment of one to the other. In lieu of the circular hole 34 shown, it is to be appreciated an oblong channelway 34 might alternatively be used, which is discussed below.

Otherwise, a threaded adjuster 64 extends from one side of each holder 32 and mounts to a slidable, yoke-shaped jaw 58 (reference FIG. 3) or clamping member to cause the jaw 58 to grasp the annular groove 38 of each ejector bar 22. The details of the construction of each holder 32 are more particularly described below with respect to FIG. 3 and wherein an isometric view is shown in exploded assembly of one of the holders 32 relative to its components.

Figure 3:
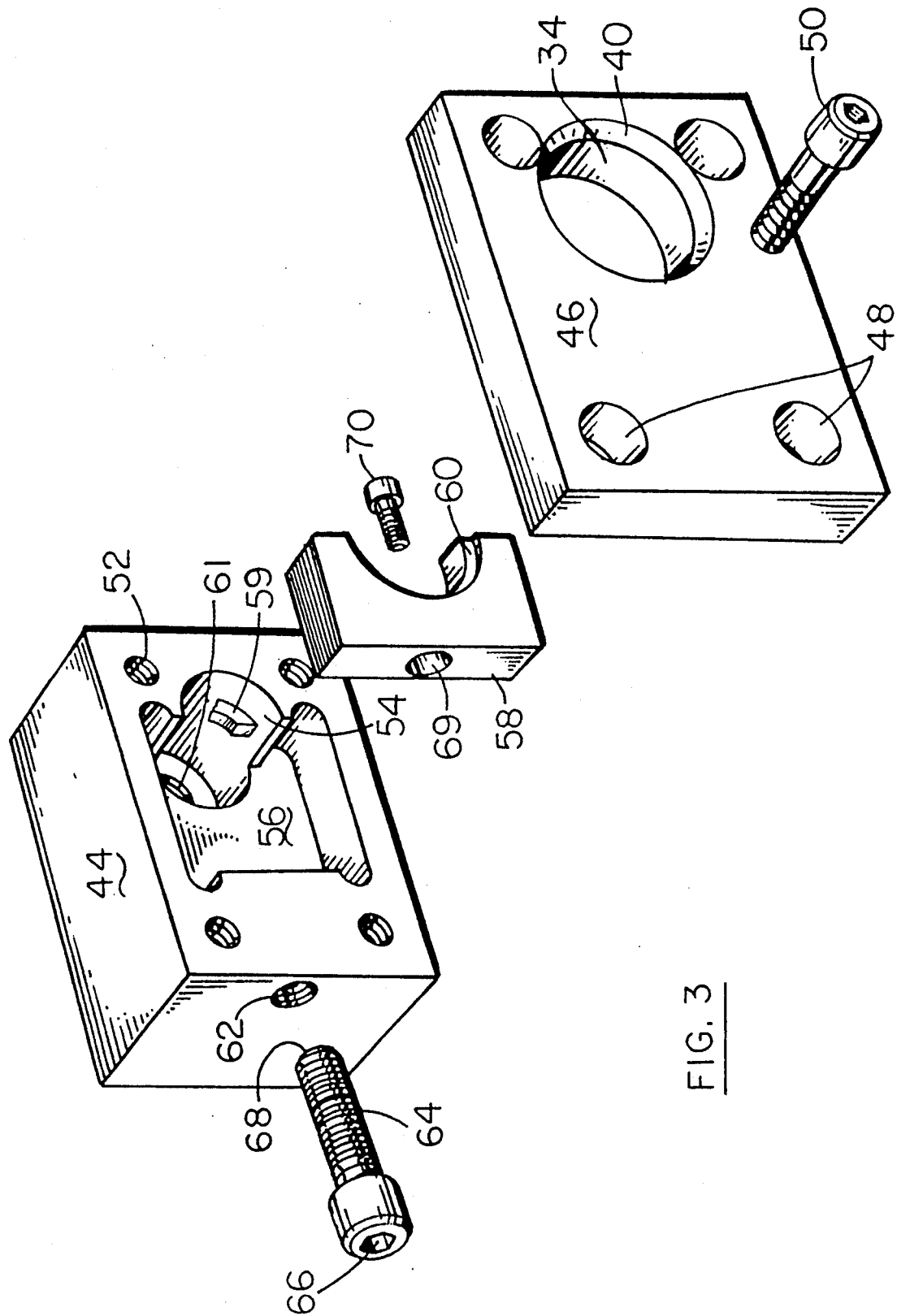
FIG. 3 shows an isometric view in exploded assembly of the present holder.

Referring to FIG. 3, each holder is generally constructed to provide a body or housing 44 and a cover 46. Countersunk holes 48 are provided at each corner of the cover 46 and whereat individual screw fasteners 50 extend to secure the cover 46 to threaded holes 52 formed in the housing 44. Otherwise, the oversized hole 34 is bored through the cover 46 and reamed to provide the chamfered edge 40 to assist in the alignment process. Alternatively the hole 34 might be formed to more of an oblong shape to facilitate the initial capture and alignment between the end assembly 35 and the holder 32.

Formed, in turn, into the center of the housing 44 to one side of a cavity 54 that aligns with the aperture 34 is a slideway 56. Supported within the slideway 56 is a moveable jaw 58 having a U-shaped gripping face. Formed through the back of the housing 44 in centered relation to the cavity 54 and cover hole 34 is a threaded aperture 61 which mates with a threaded fastener (not shown) that is inserted through the ram plate 24 and whereby each holder 32 is secured to the ram plate 24.

Turning attention to the jaw 58, an offset arcuate projection 60 is formed in the semi-circular gripping face of the jaw 58 to mate with the groove 38. The jaw 58 thus grips one side or half of the bar 22. While such a gripping action has in practice proven sufficient, alternatively one or more protrusions, such as the protrusion 59 shown in diagrammatic representation at the sidewall of the bore 54, might also be formed to project from the opposite sidewall of the cavity 54 to contact the other half of the groove 38. Although consideration must necessarily be given to not unduly obstructing the cavity 54 with too many protrusion 59 a complete grasping of the annular groove 38 is thereby obtained.

Otherwise, a threaded bore 62 extends through the housing 44 in alignment with the slideway 56. A threaded adjuster 64 having a hexagonal end cavity 66 is mounted within the bore 62. The adjuster 64 transversely extends through the housing 44 to mount within a countersunk bore 69 at the jaw 58. A fastener 70, in turn, extends through a smaller diameter portion of the bore 69 at the accurate the gripping surface 60 of the jaw 58 to secure the jaw 58 to the adjuster 64, yet allows the adjuster 64 to rotate in the jaw 58 as the jaw 58 moves relative to the bore 62 and slideway 56. That is, a threaded bore extends into the end of the adjuster 64 to a depth less than the length of the fastener 70 so that the fastener 70 bottoms out before compressively drawing the jaw 58 to the adjuster 64.

In practice therefore and upon mounting each holder 32 to the ram plate 24, each adjuster 64 may be extended and retracted as desired to cause the jaw member 58 to move to and fro. When fully retracted to the left, an extractor bar 22 is readily mountable in the cavity 54. Otherwise, once a bar 22 is seated within the cavity 54, the bar 22 is restrained to the holder 32 upon extending the adjuster 64 to cause the gripping surface 60 to mate with the groove 38.

For a molding machine equipped with the present invention, die changes merely require the retraction of the adjuster 64 to release each ejector bar 22 from its holder 32. This action is readily performed by the operator standing to one side of the typical safety equipment provided on the typical molding machine 2 with the use of an allen key.

In passing, it is also to be appreciated that the height and depth of each holder 32 is sized such that the holders 32 will not obstruct the typical throw travel of the ram plate 24 relative to the collar 8.

While the present invention has been described with respect to its presently preferred and variously considered alternative embodiments, it is to be appreciated that still others may suggest themselves to those of skill in the art. To the extent equivalent constructions may be suggested to those of skill in the art, it is contemplated that the following claims should be interpreted to include such constructions.

What is claimed is:

1. Injection molding apparatus comprising:
   a. a housing having a cavity shaped to receive a portion of an ejector bar and including a channelway defined in transverse relation thereto;
   b. a jaw slidably mounted along said channelway including a gripping surface in communication with the cavity and adapted to couple with the ejector bar; and
   c. means for extending and retracting said jaw relative to said cavity, comprising first and second threaded members, said first threaded member being rotatively mounted to said housing and including a lengthwise threaded bore and said second threaded member extending through a bore in said jaw to secure said jaw to said first threaded member such that said jaw is free to rotate on the end of said threaded member as said first threaded member extends and retracts.

2. Apparatus as set forth in claim 1 wherein the ejector bar includes an annular groove and said jaw includes a protrusion which mates with said annular groove when said annular groove is positioned in said cavity.

3. Apparatus as set forth in claim 2 including a second protrusion extending from a sidewall of said cavity to mate with said annular groove.

4. Apparatus as set forth in claim 1 wherein a bore formed in a mating cover aligns with said cavity, wherein said cover detachably mounts to said housing, wherein side walls of the cover bore narrow as they extend interiorly of said housing and wherein an end of the ejector bar which is received in the cavity includes chamfered edges.

5. Apparatus as set forth in claim 1 wherein the ejector bar comprises first and second portions, said second portion being relatively shorter than said first portion, and said first portion having an annular groove which mates with the jaw gripping surface and which includes a lengthwise bore wherethrough fastener means extend to secure the first portion to the second portion.

6. Apparatus as set forth in claim 5 wherein an end of said first portion which mounts in said cavity includes chamfered peripheral edges.

7. Ejector bar support apparatus for an injection molding machine comprising:
   a) a housing (1) having an internal cavity including a channelway defined in transverse relation to an ejector bar receiving portion of the cavity, (2) a cover including a bore aligned with the cavity, and (3) means for detachably securing the cover to the housing;
   b) a jaw slidably mounted along said channelway having a gripping surface including a protrusion; and
   c) means for extending and retracting said jaw relative to said cavity, comprising first and second threaded members, said first threaded member being rotatively mounted to said housing and including a lengthwise threaded bore and said second threaded member extending through a bore in said jaw to secure said jaw to the bore of said first threaded member such that said jaw is free to rotate on the end of said threaded member as said first threaded member extends and retracts.

8. Apparatus as set forth in claim 4 wherein the dover bore exhibits a non-circular shape.

9. Apparatus as set forth in claim 1 wherein the bore of said jaw includes means for limiting the relative insertion depths of said first and second threaded members.

10. Clamping apparatus comprising: p1 a) a housing having a cavity including a channelway in communication therewith;
    b) a jaw slidably mounted along said channelway having a gripping surface adapted to couple to a clamped object;
    c) means for extending and retracting said jaw relative to said cavity, comprising first and second threaded members, said first threaded member being rotatively mounted to said housing and including a lengthwise threaded bore and said second member such that said jaw is free to rotate on the end of said threaded member as said first threaded member extends and retracts; and
    d) means for securing said housing to a stationary support surface.

11. Apparatus as set forth in claim 10 wherein the clamped object comprises first and second elongated portions, said first portion being relatively shorter than said second portion, and said first portion having a region which mates with the jaw gripping surface and which includes a lengthwise bore wherethrough fastener means extend to secure the first portion to the second portion.

* * * * *